United States Patent

[11] 3,588,839

[72] Inventors Laszlo A. Belady;
Carl J. Kuehner, Yorktown Heights; Meir M. Lehman, New York; Brian Randell, Pleasantville, N.Y.

[21] Appl. No. 791,272

[22] Filed Jan. 15, 1969

[45] Patented June 28, 1971

[73] Assignee International Business Machines Corporation
Armonk, N.Y.

[54] HIERARCHICAL MEMORY UPDATING SYSTEM
15 Claims, 12 Drawing Figs.

[52] U.S. Cl. 340/172.5

[51] Int. Cl. G11c 9/00, G11c 7/00

[50] Field of Search 340/172.5

[56] References Cited

UNITED STATES PATENTS

| | | | |
|---|---|---|---|
| 3,248,708 | 4/1966 | Haynes | 340/172.5 |
| 3,273,129 | 9/1966 | Mullery et al | 340/172.5 |
| 3,292,152 | 12/1966 | Barton | 340/172.5 |
| 3,339,183 | 8/1967 | Bock | 340/172.5 |
| 3,341,817 | 9/1967 | Smeltzer | 340/172.5 |
| 3,351,909 | 11/1967 | Hummel | 340/172.5 |

*Primary Examiner*—Paul J. Henon
*Assistant Examiner*—Paul R. Woods
*Attorneys*—Hanifin and Jancin and Roy R. Schlemmer, Jr.

ABSTRACT: A computer memory system in which the data is transferred between high-speed local storage and one or more levels of a larger low speed storage wherein altered data is rewritten in high-speed storage immediately and in the low-speed storage on a cycle stealing basis. Controls are provided so that when a small segment of data in a particular block or page in high-speed store is altered an indicator is set. When memory buss time is available to the low speed or backup store these indicators will be checked and words or lines rewritten in said backup store as long as a higher priority job is not encountered. When it is desired to replace a complete page in high-speed storage, indicators for that page are checked and all altered words are rewritten immediately in the backup store on a high priority basis after which the page in the high-speed store may be overwritten with new data from the backup store.

INVENTORS
LASZLO A. BELADY
CARL J. KUEHNER
MEIR M. LEHMAN
BRIAN RANDELL
BY
ATTORNEY

HIERARCHICAL MEMORY UPDATING SYSTEM

CROSS REFERENCE TO RELATED APPLICATION

U.S. Pat. Application Ser. No. 513,479 of R. Nelson entitled "Replacement Algorithm" filed Dec. 13, 1965 describes a method and system for replacing blocks or pages of data between a high-speed and a low-speed storage where no further storage space is available in the high-speed store and a decision must be made as to which page of data in the high-speed store is to be replaced. This application describes a replacement algorithm based on factors other than time of arrival of any given page of data in deciding which existing page is to be replaced. As will be indicated subsequently other replacement criteria than those described in the Nelson application could be used without departing from the spirit and scope of the invention.

U.S. Pat. No. 3,317,898 of H. Hellerman entitled "Memory System" describes a particular configuration for an associative memory suitable for use with the present invention. As will be apparent from the subsequent description, certain control aspects of the disclosed embodiment make use of an associative memory. While such memories are well known in the present state of the art, reference to the above docket will specifically set forth the detailed operation of a particular type of memory suitable for use in the present system.

BACKGROUND OF THE INVENTION

In an electronic computer it is highly desirable to store all information in such a manner that it be immediately available for control and processing. To achieve the fastest processing, the best storage is of a capacity at least as large as the largest possible problem requires and has the highest possible speed. However, since the price of storage is roughly proportional to the product of (speed) × (capacity), the price of a large-capacity, high-speed memory becomes prohibitive. Therefore, existing high-speed memories have a relatively small capacity which is often exceeded by the amount of information required for single large problems or multiprogramming.

One solution to the problem of providing sufficient high-speed memories for large problems or multiprogramming is the one-level-store machine. In such a machine a large-capacity, low speed store is provided which has sufficient capacity to store all the information required for any desired problem. A low-capacity, high-speed store is also provided and programs are written as if all the information were in this high-speed store. A third memory is also provided for control purposes which indicates which information from the low speed store is also contained in the high-speed store at any given time. When the program running on the computer requires a particular word of information, a check is made to see if this word is in the high-speed store. If it is in the high-speed store, the information is retrieved and used. If the word is not in the high-speed store, a search operation is performed with the required word being transferred from the low-speed backup store to the high-speed store. While it is possible that this exchange could be made on a single word basis as the necessity arises, it has been found that, due to the slow speed of the backup store, the time delay involved in making the transfer is frequently almost independent of whether a single word or a block of words is transferred. Experience has shown that the probability is high that if a word is required, others in its locality will also be needed soon. Therefore, when a determination is made that a word of information is required from backup store, a transfer of the block containing this word is made from backup store to high-speed store.

As long as there are empty blocks of addresses in high-speed store the above-described transfer operation presents no problem. However, when the high-speed store is full, a replacement decision becomes necessary. When replacement of an information block is required, an ideal replacement criteria would always cause the block of information which is not going to be used again for the longest period of time to be replaced. Existing criteria, which have either selected the block or page to be replaced randomly or have made the selection on a first-in-first-out (FIFO) basis (i.e. have replaced the block which has been in high-speed store for the longest time), have fallen far short of this ideal.

There is a second part to the problem however, and that is concerned with the question of how modified information should be returned to the backup store. There are two well-known methods of handling this problem which lie at the extremes of the spectrum of possibilities. The first method involves leaving the entire block or page of information in the local store until the space it occupies is required. When this event occurs, the modified page is wholly transferred to the backup store. This approach normally provides for simply overwriting the page, when it is known that the contents have not been modified, and that a valid copy of the information still exists in backup storage.

The primary advantage of this technique is that a minimum number of channel requests are generated. However, the amount of information transferred for each channel activation is large relative to the scheme described below. A secondary advantage is that during a single period of residence of a page in the local store, any line may be changed many times without increasing the total amount of information which must finally be transferred to the backing store.

The disadvantages of this approach are three fold. First, if the "cost" of storage is defined as the product of the amount of space occupied and the real time of occupancy, it is clear that this approach involves a higher "cost" than one which would always permit the instantaneous overwriting of the page when space was required. Secondly, although a minimum number of channel activations are initiated, the large amount of information transferred at each initiation brings about a period during which nothing else can utilize this channel. This is of greater or lesser significance depending upon the number of channels available and the overall storage management policy (e.g. demand-paging, (etc.) Third, since the processor will be delayed for the amount of time required to transfer the outgoing page to the backing store and bring in the required page, as well as updating all the system tables this approach reduces processor operation to bursts of activity followed by substantial periods of delay.

A second well-known approach to this problem, involves the "storing through" of a single word of information to both the local and backing store on each store instruction. This approach alleviates the necessity for swapping an entire page to the backing store, when additional space is required. Consequently, a new page to be transferred from backing store can always overwrite the page present in the local store. This has the effect of reducing processor delay caused by awaiting the new information and also of reducing the "cost" of storage by minimizing the time of occupancy.

The disadvantage, on the other hand, includes the fact that the processor is somewhat limited by the rate at which the slower of the storage devices will accept store instructions.

Secondly, a maximum number of channel initiations are generated since the execution of each store instruction causes an update of the backing store. The overall efficiency of this approach depends therefore on the distribution of the elapsed time between consecutive storage references.

From the above comments, it should be clear that both of the well-known approaches have distinct advantages and disadvantages. It is desirable to obtain the advantages of both approaches and yet minimize the disadvantages of either.

SUMMARY AND OBJECTS OF THE INVENTION

It has now been found that a significant improvement in paging schemes involving a small high-speed local storage and a large lower speed backup storage may be accomplished by utilizing a "delayed store-through technique." Although the subsequent description is based on a simple two-level hierarchy of memories, the concept is of a greater generality and could be utilized to control the data flow between any two levels of a many leveled hierarchy.

In essence, the method of operation of the system requires that whenever a word or line of a page is modified during execution by the computer, it is placed in the local store and an appropriate flag created indicating the change. Whenever the backup store has access time available these flags are scanned and lines of data with set flags are transferred to the backup store and the flags reset. Thus operation continues as long as time is available, or modified lines exist, or until another high priority request interrupts the memory operation. However, if the occasion arises that the space occupied by a page in local store must be obtained, the system switches over to a second mode in which only the required words in the local storage are immediately rewritten in the backup store on a high priority basis and immediately subsequent thereto the local store may be overwritten with a new page. However, if it is determined that no changes in the backup store must be made, either due to nonactivity or prior service by the above-described sequence, the overwriting of a new page may occur immediately.

It is accordingly a primary object of the present invention to provide a memory paging system combining the features of demand paging and direct store-through.

It is a further object to provide such a system where backup store may be continuously updated on a cycle stealing basis.

It is yet another object to provide such a memory control for effecting "delayed store-through" during normal system operation without interrupting any other system functions.

It is a still further object to provide such a system where demand paging may be effected when necessary.

The foregoing and other objects, features and advantages of the invention will be apparent from the following more particular description of a preferred embodiment of the invention, as illustrated in the accompanying drawings.

DESCRIPTION OF THE DISCLOSED EMBODIMENT

Figure 1:
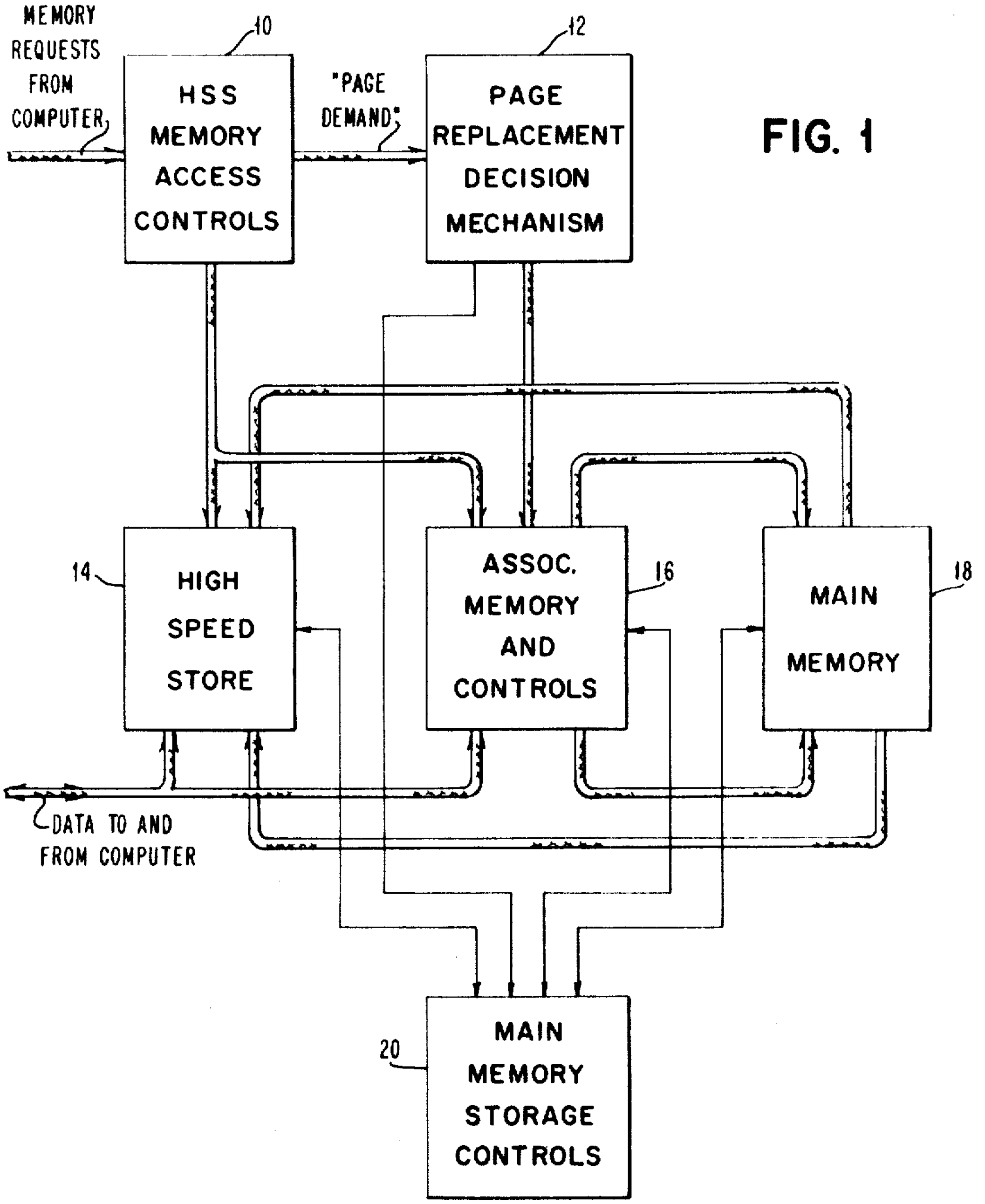
FIG. 1 is a functional block diagram of the disclosed embodiment set forth in detail in FIGS. 2A through 2E.

The objects of the present invention are accomplished in general by a hierarchical memory system for use in an electronic computing system including a small high-speed memory and a large low speed memory. Said memories are organized such that the high-speed memory has storage space available for a plurality of first data segments, each said first data segment being composed of a plurality of individually addressable second data segments. These data segments are conventionally referred to as pages and words respectively. Means are provided for transferring complete first segments of data from the large low speed memory into the high-speed memory and further means are provided for immediately rewriting any second data segments altered by the computer in the high-speed memory. Means are included for rewriting such altered data in the low-speed memory whenever time is available therein unless the data is part of a first data segment or page which is to be removed from the high-speed memory. In this eventuality, alternate control means are operable to write all altered second segments of data into the low-speed memory on a high priority basis after which the first data segment may be removed from the high-speed store or more conventionally overwritten by a new first segment. It will of course be understood that no word in the high-speed store may be altered by the computer unless that word in a prior form is previously stored therein. The term "altered" can apply to a value or word which is actually changed or to a result which has an empty location until some computation is performed.

According to the preferred embodiment of the invention, the means for controlling the writing of altered data into the low speed memory includes a small associative memory in which each altered second data segment is stored concurrently with the rewriting in the high-speed store. Additionally, the address of the word in said low-speed storage is included in an address field of the associative memory. As will be understood, the particular first data segment or page in which the data word is located is readily ascertainable from this overall address.

The associative memory in essence controls the transfer of words back into the low-speed memory wherein the service being given a page element is based on a predetermined priority. When it is determined that a given page must be replaced, the associative memory is repeatedly interrogated for word alterations for that particular page and the necessary rewriting is done in the low-speed memory until all such words have been rewritten. It is important to note that this last operation is done on a high priority basis.

The relatively large first segments of data referred to previously are conventionally referred to as pages whereas the second data segments making up a page would normally be separately addressable memory words. In the remainder of the description of the invention, this terminology will be used to simplify the explanation, however, the designations are not intended to be construed as limiting on the scope of the invention. The designation word normally applies to a single discrete element of data addressable from memory on a single read operation. In some machines, a word is composed of several bytes. Byte addressing is allowed wherein the bytes may be thought of as individual words which may be separately accessed from various data registers. In the present system, the designation word will refer to the smallest discrete unit of data within a page which is directly accessible on a single read cycle and not to an individual byte.

As stated previously, in the Background of the Invention Section, the store through approach to memory management wherein altered data words are immediately rewritten in both the high-speed store and also the low-speed or backup store involves many unnecessary interruptions in the operation of the backup store. Conversely, the "demand paging" concept, wherein no alterations are made in backup store until the page is to be 34low-speed causes extensive interruptions in the operation of the backup store since the entire page is rewritten if only, a single bit has been altered. The present invention is designed to perform the majority of the rewriting operations in backup store on a cycle stealing basis, or stated conversely, when the backup store is free. Thus, in the majority of cases when it is necessary to remove or rewrite a page in the high-speed store, all of the alterations will have been disposed of and no rewriting will be necessary i.e., the space is immediately useable). Alternatively, if some rewriting is necessary, only those words will be rewritten to backup store which have not been previously taken care of. This materially reduces the time required before the new page can be written into high-speed store.

It should be clearly understood that the present invention is intended to operate in the conventional one-level store mode such as is described in the previously referenced copending application Ser. No. 513,479. That is to say, the programmer in essence sees a virtual memory wherein he is not aware of the specific two-level nature of the memory hierarchy. Whenever memory requests are made, a first determination is made to see if the requested word is currently in the high-speed store and, if not, appropriate accessing operations occur wherein a page including said word is transferred from backup into high-speed store on a fully automatic basis. The present invention works completely within this framework and has no effect on the programmer's operations other than to reduce overall problem solving time for any given task. Such a memory system must provide for transferring data into the computer on call and for rewriting any altered data back into memory. The readout operation occurs in the high-speed store, and is purely conventional in nature. It forms no part of the present invention other than as it affects the requirement for a new page to be transferred from main memory into the high-speed store. The three essential operations relevant to the present invention are (1) the writing of a new or altered word from the main computing system into the high-speed store, (2) the writing of such new or altered words into the backup store, and (3) the necessary operations when a new page is to be transferred from the main memory into the high-speed store.

The present embodiment of the system uses a small associative memory as a major control element. Any words which must be rewritten in the main memory in effect passes through this associative memory. Thus, all three operations enumerated above are affected by the presence of the associative memory whereby in (1) altered words must be written concurrently in both the high-speed store and the associative memory, and (2) the actual writing into the backup store proceeds from the associative memory to the backup store. Finally, with operation (3), as outlined above, all altered words in the particular page to be rewritten from the associative memory must first be rewritten to the backup memory before the space can be released. It should be noted that due to the nature of the present system and the necessity of storing all altered words in the associative memory, that when a word is received from the processor which is in such altered form, it must be stored in both the high-speed and the associative memory. If no storage location is currently available in the associative memory, the computer operation must be held up until space is available. It will of course be readily recognized that some additional buffering arrangement could be provided to obviate this requirement. However, for the sake of simplicity, this requirement is assumed to be present in the disclosed embodiment.

As stated previously, an associative memory suitable for use with the present system is set forth and described in great detail in U.S. Pat. No. 3,317,898 as well as in copending application Ser. No. 513,479. Essentially, the same associative memory is disclosed herein as in these two prior applications. The operation of the associative memory will be described generally with respect to FIGS. 4A, 4B, 5 and 6 subsequently. For a more detailed description of the operation of such a memory, reference should be made to these two copending applications. The essential operational feature of the match indication of the present system is that when the match criteria or argument is supplied to the memory, only the lowest match will be utilized or required for the operation of the present system. Thus, assuming there were storage locations from zero through 99 in the associative memory, the first successful match closest to zero would be indicated and appropriate read or write operations would occur in this word. Two match associations are made in the associative memory. The first is on a write cycle when an altered word is being concurrently written into the high-speed store and in the associative memory. All of the vacancy bits are interrogated, the first vacant word storage location is selected and the altered word is read into same with appropriate data and address fields. Secondly, when a particular page address is being sought for either a low priority or high priority store in the main memory. The first word having this page address is selected and in turn rewritten in main memory at the designated word address. These operations will be further set forth in the specific description of FIG. 2 (2A—2E).

Having thus generally described the underlying philosophies and concepts of the present invention, the disclosed embodiment will now be set forth and described with reference to the drawings. Referring first to FIG. 1, a memory system constructed in accordance with the present invention is shown in functional block form. It should be noted that this format follows the organization of the logical schematic diagram of FIGS. 2A—2E. The contents of block 10 entitled "high-speed store memory access controls" are not included in FIG. 2 since these are essentially conventional in nature and merely check to see if the requested memory address from the computer is actually in the high-speed store 14 or must be fetched from the main memory 18. If it is determined that a required bit of information is not present, a "page demand" signal is sent to the page replacement decision mechanism 12 which will first check to see if a vacant page is available in the high-speed store and if not, will decide which page currently therein is to be replaced. This replacement decision forms no part of the present invention, the only significant output of block 12 relevant to the invention is that ultimately a page address will be produced indicating the particular page currently in the high-speed store 14 which is going to be replaced. This address, as will be described subsequently, is compared against all page addresses in the associative memory so that all altered words stored therein forming a part of this page may first be rewritten in the backup store prior to rewriting the entire page. The address and data flow between the high-speed store 14, the associative memory 16 and the main memory 18 is indicated by the cables on the FIG. By examining the FIG., it will be noted that data proceeds from the computer to both the high-speed store 14 and the associative memory 16. Data from the computer may reach the main memory 18 only through the associative memory 16. Similarly, data may be transferred from the main memory 18 only to the high-speed store 14. Block 20, indicated as the main memory storage controls, as will be appreciated, control the actual transfer of data between the high-speed store, the main memory and the associative memory. Control lines are shown interconnecting this unit with all of the other blocks of the system with the exception of the high-speed store memory access controls 10, since this unit does not actually affect the present invention. When a write command goes from unit 10 to the high-speed store 14, an indication of this fact proceeds from the store 14 to the controls 20 as indicated. The control unit 20 receives three primary enabling signals from the system corresponding to the three functions enumerated previously. In order of ascending priority, these are described below.

When the main memory 18 has storage time available, it will notify the controls 20 of the fact that time is available to store an altered word from the associative memory if there is one. At this point, the controls interrogated the associative memory 16 for some particular page specified by the page ID counter (which will be described subsequently) and an altered word will subsequently be accessed and transferred to main memory.

The next possible operation will be a write indication from the computer indicating that a new word is to be written into the high-speed store. This will cause a search for a vacancy in the associative memory to be initiated and, if one is found, the word will be written into both the high-speed store and the associative memory 16. If on the other hand, no vacancy is found, the computer operation is held up until a vacancy is created in the associative memory as described previously.

Finally, the highest priority operation is an indication from the page replacement decision mechanism 12 indicating that a whole page in high-speed store 14 must be replaced. An address is supplied from the page replacement decision mechanism 12 to the associative memory 16 and all altered words bearing this page address are sequentially written in main memory 18 and upon completion, an appropriate signal is provided which will allow the replacement of the entire page in high-speed store with a new page from main memory.

Having thus generally outlined the operation and organization of the present system, the specific description of FIGS. 2A—2E, which comprise a combination functional and logical schematic diagram of the system will be set forth. It is to be noted that the same general reference numerals for the high-speed store, the associative memory and the main memory are utilized in FIG. 2. The majority of the control mechanism shown in these FIGS., which will be subsequently referred to generally as FIG. 2 comprise the contents of the block 20 on FIG. 1. It should again be noted that the specific controls in blocks 10 and 12 are not included since, as stated previously, they form no part of the present invention, it being further noted that the inputs from these blocks are shown to the left and top of FIG. 2A and across the top of FIG. 2C.

As stated above the highest operation priority is used when the replacement algorithm mechanism requests the transfer of a page. The transfer of a page means the transfer of a page from main storage to a page frame in the high-speed store. A page frame is a section of high-speed store which can contain a page. When this happens, the page identification number is placed in the "page identification" counter 101 and this is used as the argument to find all the words in this page that are in the associative memory. As each one is found, it is transferred to the main store. When all are transferred to the main store, a signal is produced which tells the replacement algorithm mechanism that the page can now be replaced in high-speed store.

Figures 2, 2A:
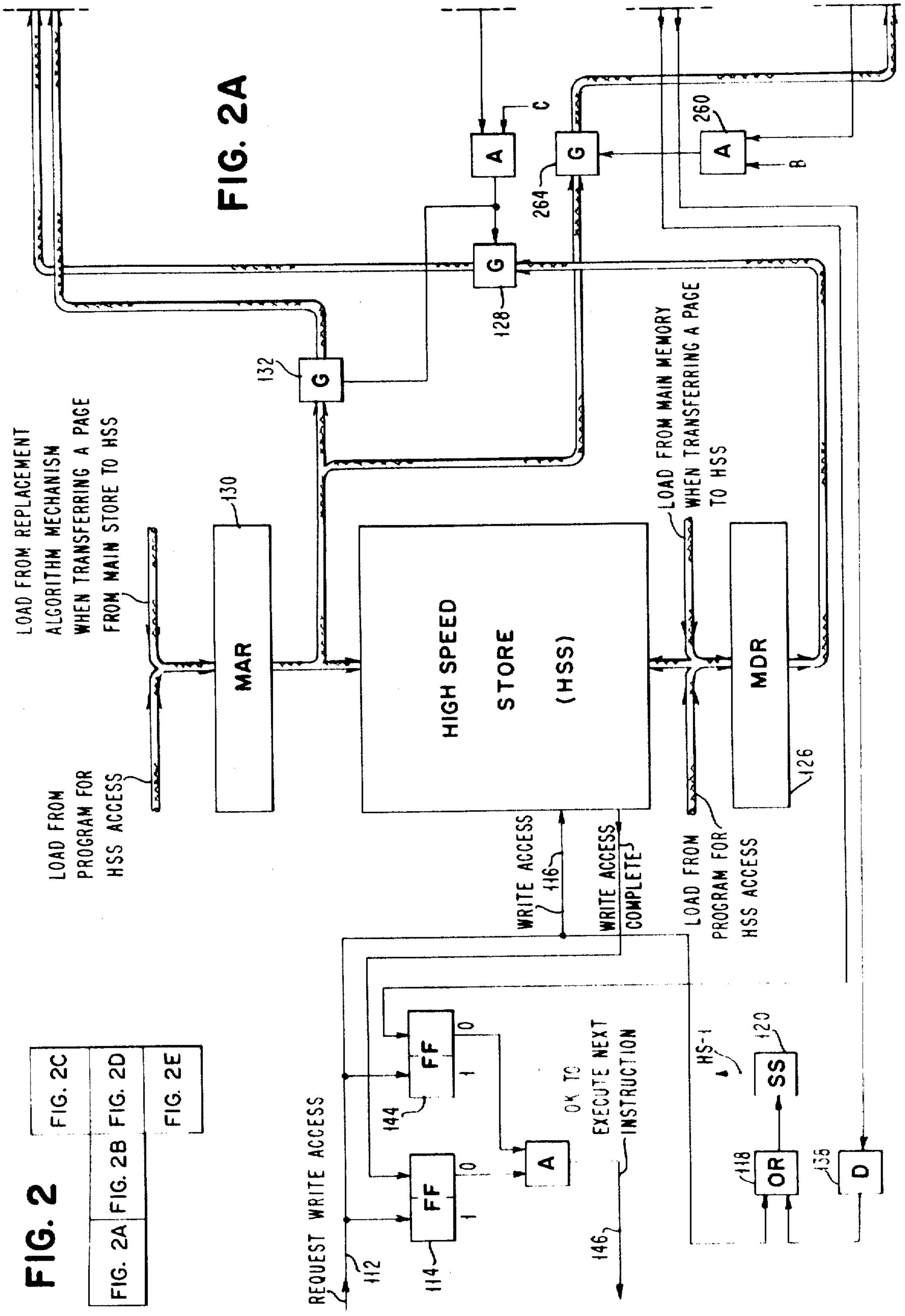
FIG. 2 is an organizational drawing illustrating the relative positions of FIGS. 2A through 2E.
FIGS. 2A through 2E comprise a combination functional and logical schematic diagram of a preferred embodiment of the present system.
Figure 3:
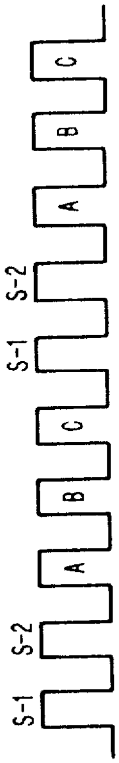
FIG. 3 comprises a diagram of typical timing pulses for the embodiment of FIGS. 2A through 2E.

Referring to FIG. 2, flip-flop 100 is set to its 1 state when the replacement algorithm mechanism requests a transfer of a page. Flip-flop 102 is set to 1 when a store access is requested of the high-speed store. Flip-flop 104 is set to 1 when the main store indicates an opportunity to transfer a word from the associative memory to the main store. Because all of these operations require use of the associative memory, only one of the operations can run at any one time. Flip-flop 100 is thus the highest priority flip-flop. Flip-flop 102 is the next highest priority and the lowest priority flip-flop is 104. A train of pulses are continuously generated for the use of the associative memory. These pulses are, S–1, S–2, A, B and C. These five pulses are continuously generated by any conventional clock means (not shown). The pulses are shown in FIG. 3. The S–1 pulse is used to test the flip-flops 100, 102 and 104. The leftmost one of these flip-flops which is in its 1 state will be found and its state transferred to one of the flip-flops 106, 108 or 110. Because flip-flops 100, 102 and 104 are set at random times, it is conceivable that the S–1 pulse might be split between two adjacent flip-flops and thus set more than one of the flip-flops 016, 108 and 110. To correct this possibility, the S–2 pulse is provided. The S–2 pulse tests the flip-flops 106, 108 and 110. It finds the leftmost one that is in its 1 state, and sets those at the right to their 0 states.

It should be mentioned that flip-flops 250 (FIG. 2) is initially in its 0 state which means that AND circuits 252 and 254 will be enabled. When flip-flop 250 is in its 1 state, the S–1 and S–2 pulses are ineffective. This will be explained later.

WRITING WORDS INTO THE HIGH-SPEED STORE & ASSOCIATIVE MEMORY

When the CPU request a "write" access to the high-speed store, a pulse appears on wire 112, FIG. 2A. This pulse is effective to set flip-flop 114 to its 1 state and also to initiate a "write" access of the high-speed store via wire 116. The same pulse is effective via OR circuit 118 to start single shot 120. This will produce a pulse labeled HS–1 which is used to set flip-flop 102, FIG. 2E, to its 1 state. As mentioned previously, if flip-flop 102 is not in its 1 state, the S–1 pulse and the S–2 pulse will be effective to set flip-flop 108 to its 1 state.

Figure 2B:
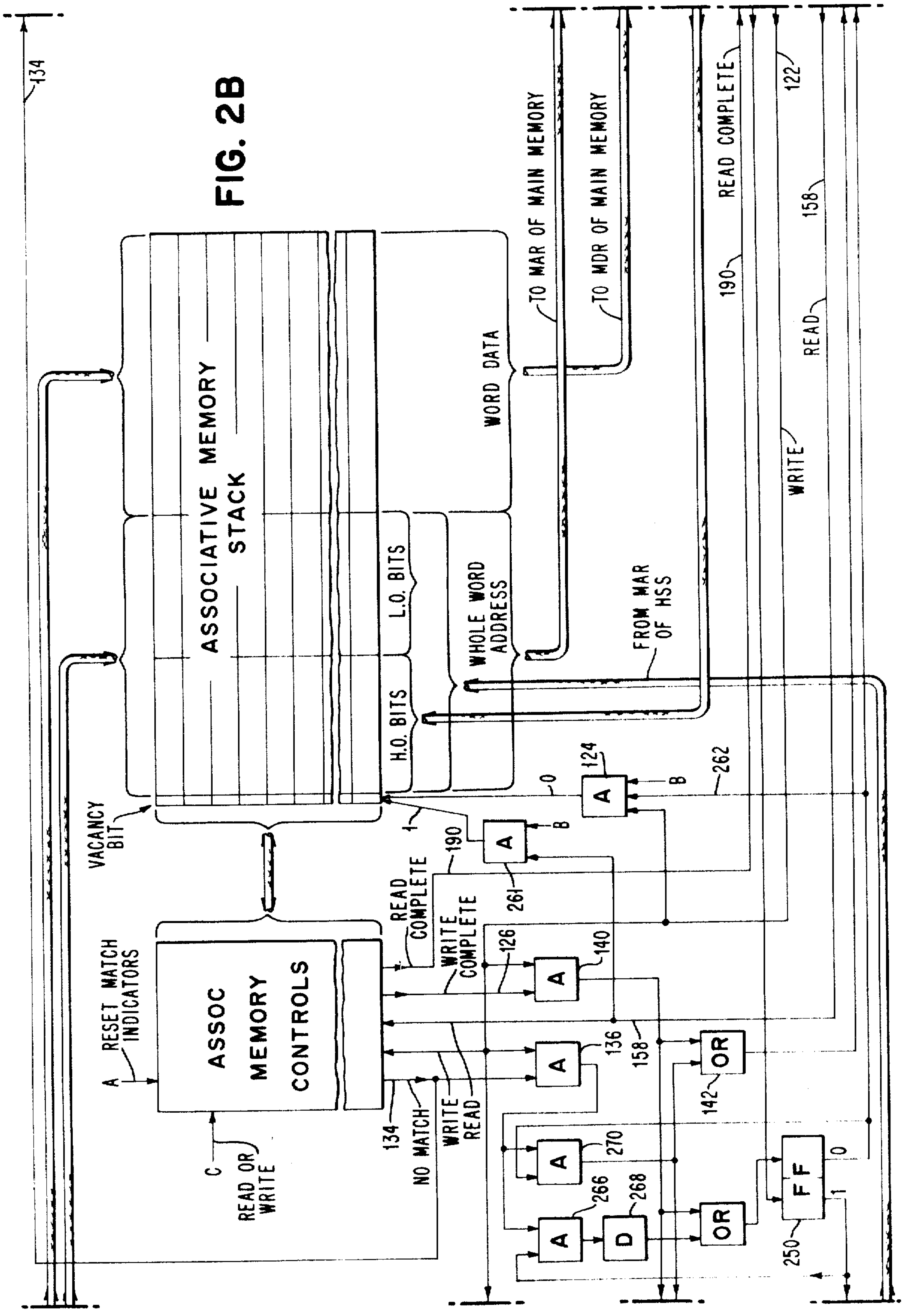
Figure 2C:
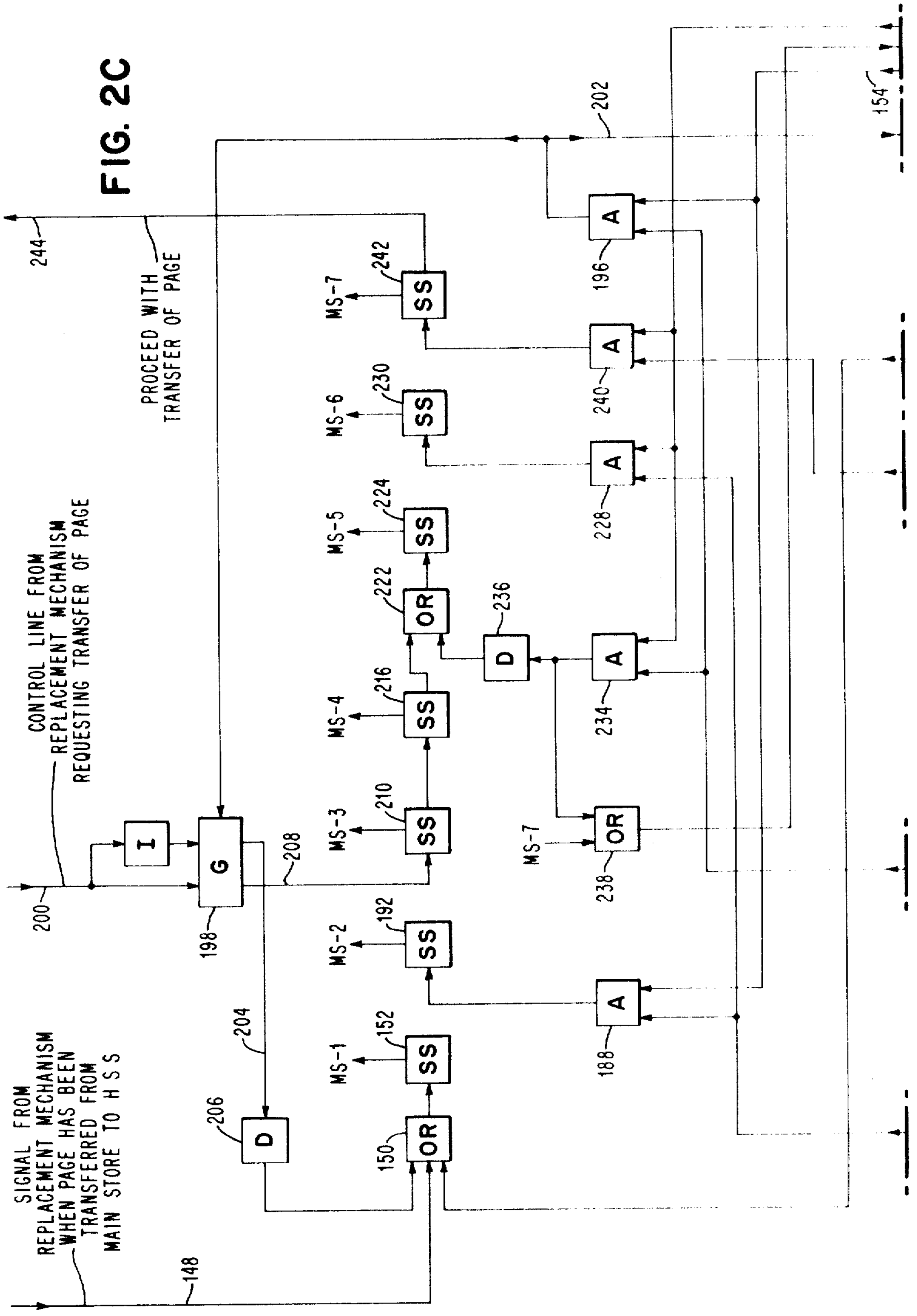
Figure 2D:
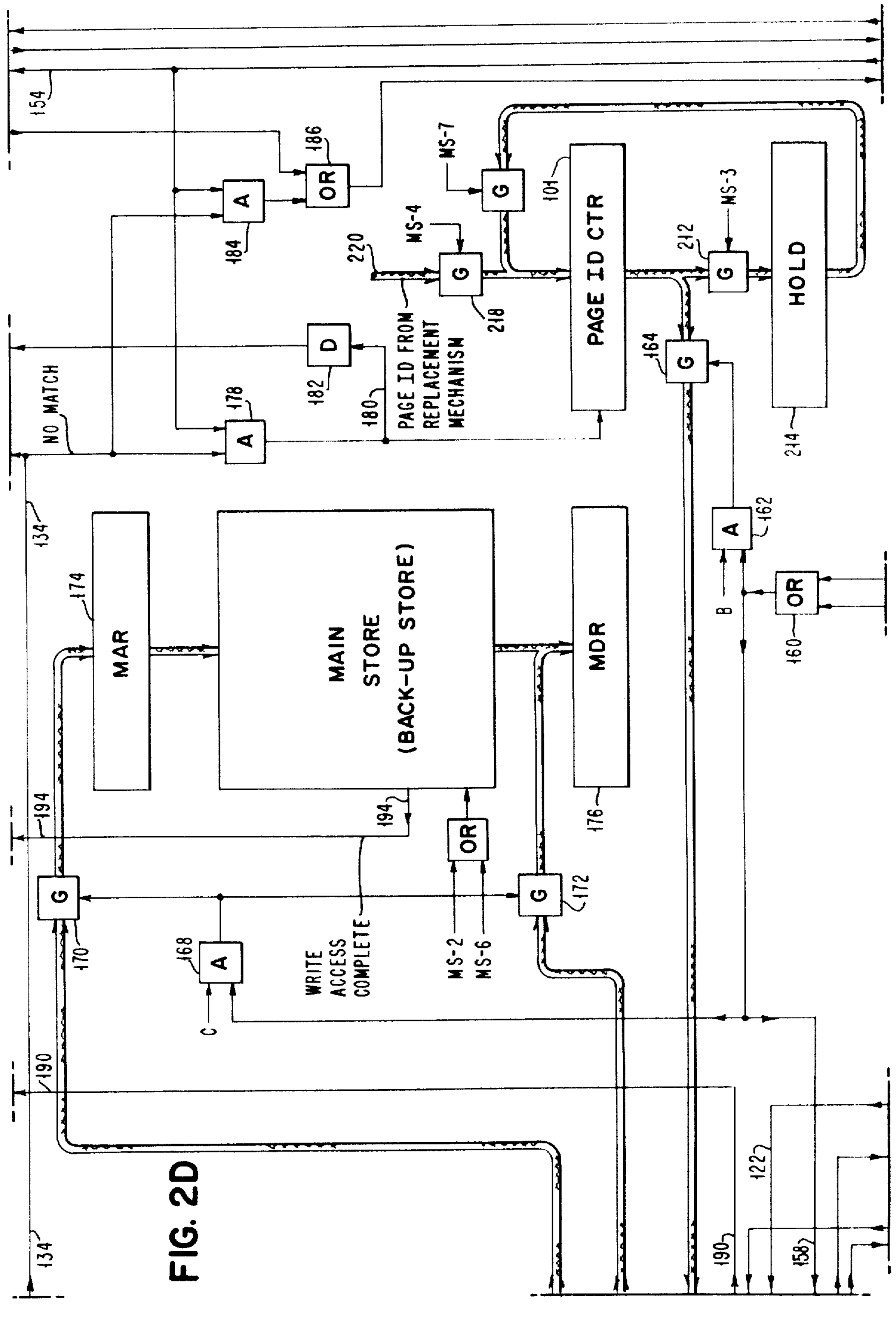
Figure 2E:
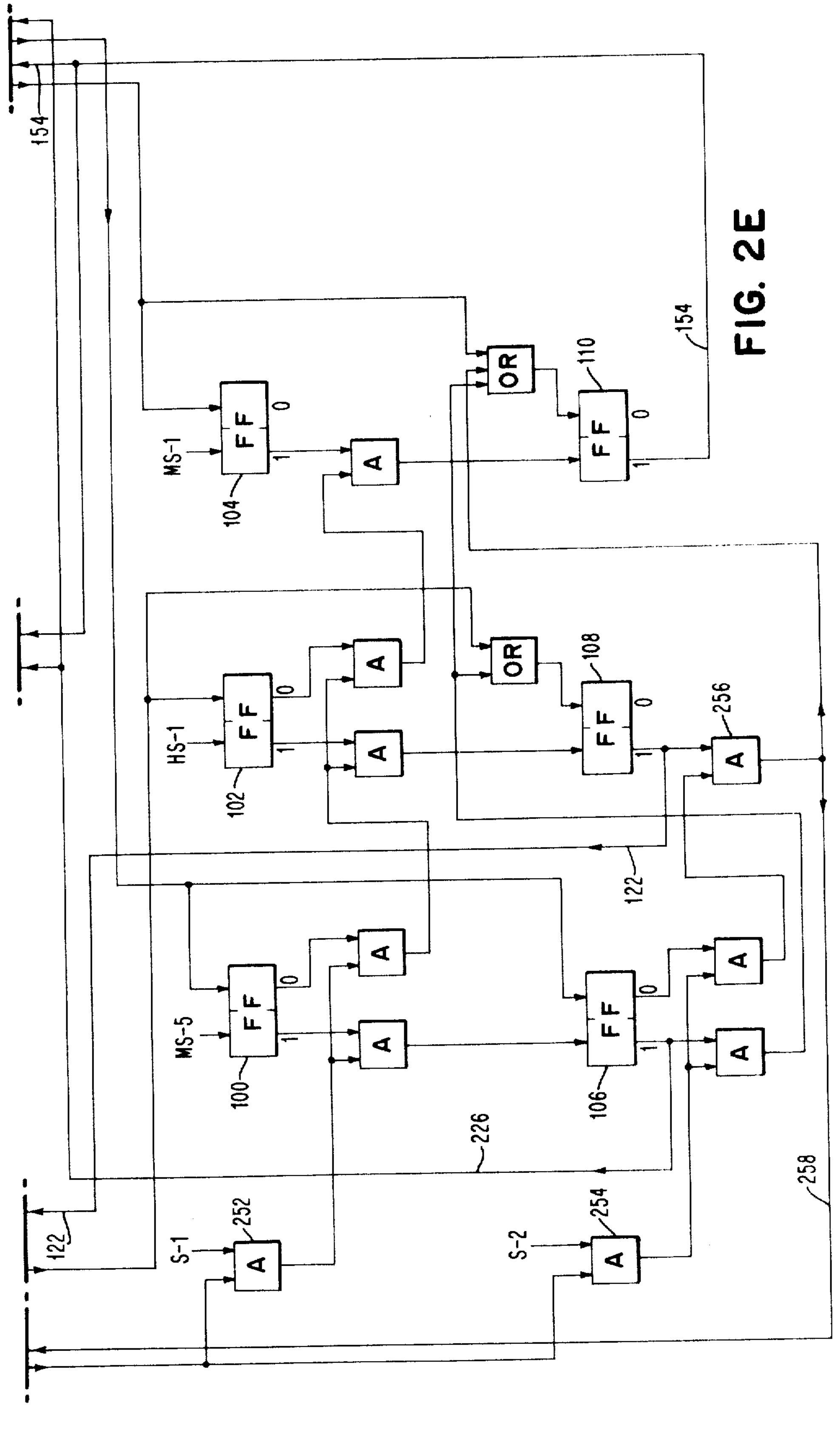

On FIG. 2E, when the S–2 pulse exits from AND circuit 256, it is fed back via wire 258 to FIG. 2B where it sets flip-flop 250 to its 1 state. Flip-flop 250 is the control which forces the associative memory to look for a previous entry which matches the address in the MAR of the high-speed store. It is possible that the same word was changed previously and not yet written back in the main store. If such a previous entry is found, it will be overwritten. If not, the system will continue with a second cycle during which it will look for a vacant space in the associative memory. If a vacant space is found, the entry will be made in the vacant space. With flip-flop 108 in its 1 state, wire 122 will be active. It will be noted that wire 122 extends to the "write" control line of the associative memory controls, FIG. 2B. This will initiate a "write" operation in the associative memory during the next C pulse.

With flip-flop 250 (FIG. 2B) in its 1 state, AND circuit 260 will be enabled and line 262 will be disabled. At B time in the following cycle AND circuit 260 will have an output which is applied to gate 264 (FIG. 2A) in order to permit an association operation using the contents of the MAR 130 as the argument.

The A pulse is used to reset the match indicators in the associative memory controls. The C pulse is used to enable either the "read" lines or the "write" lines. In the operation being described, if a matching address is found in the associative memory, the data contained in the MDR register 126, FIG. 2A, of the high-speed memory will be gated via gate 128 to the appropriate field of the associative memory. The address which is contained in the MAR 130 of the high-speed store will be gated via gate 132 to the appropriate field in the associative memory. In this manner, the word stored in the high-speed memory is also stored in the associative memory along with its address.

Assuming a match is found, a pulse will appear on the "write complete" wire 126 and pass through the AND circuit 140. This pulse will reset flip-flops 144, 250, 102, and 108 to their 0 states.

If no match is found, a pulse will appear on wire 134 and pass through AND circuit 136. Because AND circuit 266 is enabled (flip-flop 250 in its 1 state) the pulse will pass through Delay circuit 268 and reset flip-flop 250 to its 0 state. The purpose of the Delay circuit 268 is to prevent flip-flop 250 from going to its 0 state until after the S–1 and S–2 pulse have occurred in the next cycle.

A second cycle will follow in the associative memory in which it will look for an empty space. The action is as follows. The active state of wire 122 extends to AND circuit 124, which is now enabled by wire 262, so that, at B time, the output of AND circuit 124 will be used to associate on the vacancy bit of the associative memory in order to find the top most empty space in the associative memory. The A pulse is used to reset the match indicators in the associative memory controls as before. The C pulse is used to enable either the "read" lines or the "write" lines. In the operation being described, if an empty place is found in the associative memory, the data contained in the MDR register 126, FIG. 2A, of the high-speed memory will be gated via gate 128 to the appropriate field of the associative memory. The address which is contained in the MAR 130, of the high-speed store will be gated via gate 132 to the appropriate field in the associative memory. In this manner, the word stored in the high-speed memory is also stored in the associative memory along with its address. If the associative memory happened to be full, a pulse would appear on wire 134, FIG. 2B, which would pass through the AND circuit 136, and AND circuit 270, the delay circuit 138 and the OR circuit 118 in order to start single shot 120 again. It was mentioned before that when the "write complete" pulse appears on wire 126, that it passes through AND circuit 140 and resets flip-flops 102 and 108 to their 0 states. In the case where the associative memory is full and a pulse appears on the "no match" line 134, this pulse is effective via OR circuit 142 to also set both flip-flops 108 and 102 to their 0 state. However, under these circumstances, it will be noted that single shot 120 is started again after a slight delay and the HS–1 pulse is used to again set flip-flop 102 to its 1 state. With flip-flop 102 in its 1 state, another attempt will be made to write the word and its address in the associative memory. It should be pointed out that at the same time that flip-flop 114 is set to its 1 state that flip-flop 144 is also set to its 1 state. Flip-flop 144 cannot be reset to its 0 state until the "write complete" pulse appears on wire 126. Flip-flop 114 is reset to its 0 state when the "write" access to the high-speed store is complete. The CPU cannot execute its next instruction until line 146 becomes active which happens when both flip-flops 114 and 144 are in their 0 states.

TRANSFER OF WORDS FROM ASSOCIATIVE MEMORY TO MAGNETIC STORE

For this operation, a "page ID counter," FIG. 2D, is used to keep track of the pages. This counter counts from zero to the maximum number of pages, then it resets back to zero. For example, if there are eight pages, the counter would count from zero to seven and then revert back to zero. Initially, it could be set to any number within its range. The mechanism is started by a signal on line 148, FIG. 2C, which occurs when a page has been transferred from main store to high-speed store. This signal passes through the OR circuit 150 and is used to start single shot 152. The MS–1 pulse is used to set the flip-flop 104, FIG. 2E, to its 1 state. With flip-flop 104 in its 1 state, flip-flop 110 will be set to its 1 state by means previously described. Line 154 will be active. The active state of line 154 extends through the OR circuit 160, FIG. 2D, to line 158 which is the "read" control line for the associative memory. The active state of line 154 extends through the OR circuit 160 to the AND circuit 162. At B time, AND circuit 162 will have an output which extends to gate 164 in order to gate the "page ID counter" to the association circuits. It should also be noted that the output from OR circuit 160 is applied via line 158 to AND circuit 261, the other input to which is supplied directly by the B pulse. This gates a 1 into the associate lines of the vacancy bit of the associative memory together with the page identification. This insures that only those page matches will be obtained where the vacancy bit is filled (set to 1) otherwise it would be necessary to reset the address field of the associate memory after each readout. The active state of line 154 extends through the OR circuit 160 to the AND 168, FIG. 2D. At C time AND circuit 168 will have an output which extends to gates 170 and 172. If a matching page address or number is found in the associative memory, gate 170 will be effective to gate the address portion of the word to the MAR register 174. Gate 172 will be effective to gate the data portion of the word to the MDR register 176. In this manner, a word in the associative memory is transferred to the address and data registers of the main store. The active state of line 154 extends to AND circuit 178, FIG. 2D. If no matching word were found in the associative memory a signal would appear on the "no match" line 134 which extends to AND circuit 178. AND circuit 178 would thus have an output which increments the "page ID counter." A branch circuit will extend via wire 180, delay circuit 182 and OR circuit 150 to again turn "on" the single shot 152. This will cause the operation to be repeated for the next page number. The active state of line 154 extends to AND circuit 184, FIG. 2D. A signal on the "no match" line 134 is thus effective through AND circuit 184 and OR circuit 186 to reset flip-flops 110 and 104 to their 0 state. The active state of line 154 extends to AND circuit 188, FIG. 2C. A pulse on the "write complete" line 190 is effective through AND circuit 188 to turn "on" single shot 192. The MS–2 pulse is used to start a "write" access in the main store, FIG. 2D. When this "write" access is complete, a pulse will appear on wire 194. The active state of wire 194 extends to AND circuit 196. The pulse on line 194 will pass through the AND circuit 196, FIG. 2C and be applied to gate 198 in order to test line 200. A branch circuit extends via line 202 and OR circuit 186 in order to reset flip-flops 110 and 104 to their 0 state. If line 200 is not active, a pulse will appear on wire 204 which extends through the delay unit 206 and the OR circuit 150 to again turn one single shot 152. This will permit the just described operation to be repeated.

OPERATION WHEN AN IMMEDIATE TRANSFER OF A PAGE IS REQUIRED

In the preceding description, it was mentioned that each time a "write" access is completed in the main store, that wire 200 is tested. If wire 200 is active, a pulse will appear on wire 208 which turns on single shot 210. The MS–3 pulse is applied to gate 212 in order to gate the number in the "page ID counter" to the "hold" register 214. When single shot 210 goes "off," it turns "on" single shot 216. The MS–4 pulse is applied to gate 218 in order to gate the "page ID number" which is on cable 220 to the "page ID counter." When single shot 216 goes "off," a pulse passes through the OR circuit 222 to turn "on" single shot 224. The MS–5 pulse is used to turn flip-flop 100 to its 1 state. With flip-flop 100 in its 1 state, flip-flop 106 will be set to its 1 state in a manner previously described. Line 226 will be active. The active state of line 226 extends through the OR circuit 160 to wire 158 which is the "read" control for the associative memory. The active state of wire 226 extends through the OR circuit 160 to the AND circuit 162, FIG. 2D. At B time, AND circuit 162 will have an output which is used to gate the "page ID counter" to the association circuits of the associative memory. The active state of wire 226 extends through the OR circuit 160 to the AND circuit 168. At C time, AND circuit 168 will have an output which extends to gates 170 and 172 so that if a match is found in the associative memory, the address portion of the word can be read through the gate 170 to the MAR register 174 of the main store. The data portion of the word will be read through the gate 172 to the MDR register of the main store. The active state of wire 226 extends to AND circuit 228, FIG. 2C. If a matching word is found in the associative memory a pulse will appear on wire 190 which extends through AND circuit 228 and is used to turn "on" single shot 230.

The MS–6 pulse is used to start a "write" access of the main store. The active state of wire 226 extends to AND circuit 234, FIG. 2C. When the "write" operation is completed in the main store a pulse will appear on wire 194 which extends through AND circuit 234 to OR circuit 238, the output of which is used to reset flip-flops 106 and 100 to their 0 states. A branch circuit extends through the delay unit 236 to the OR circuit 222, the output of which is used to turn "on" single shot 224. The MS–5 pulse sets flip-flop 100 to its 1 state and the operation will be repeated. The active state of wire 226 extends to AND circuit 240, FIG. 2C. If no matching word is found in the associative memory, it means that any changes in the page have been completely written in main memory. In this case, a pulse will appear on wire 134 which extends through AND circuit 240 and is used to turn "on" single shot 242. The MS–7 pulse is applied to the OR circuit 238, FIG. 2C, in order to reset flip-flops 106 and 100 to their 0 states. This portion of the system controls will cause the words in the associative memory from the same page to be sequentially rewritten in main memory on the same high priority basis until no more such words are present. When single shot 242 goes "off," a pulse will appear on wire 244 which signals the replacement algorithm mechanism to proceed with the transfer of a page from main store to high-speed store.

The MS–7 pulse is also applied to gate 246 in order to gate the contents of the "hold" register 214 to the "page ID counter." The mechanism which transfers words from the associative memory to the main store can now return to its low priority task at the point where it was interrupted.

It is believed that preceding description of the operation of the disclosed embodiment set forth in FIG. 2 will allow a person skilled in the art to adapt the principles of the present invention to any existing hierarchical storage system utilizing at least two different levels of storage, assumedly with differing speed characteristics, and also utilizing paging techniques wherein complete pages of data are transferred from slower to faster memory as needed. While the general function and operation of the associative memories are believed to be quite well known in the art, the specific operation of a suitable associative memory configuration, such as set forth in FIG. 4A, 4B, 5 and 6 will be explained for the sake of clarity.

Figure 4A:
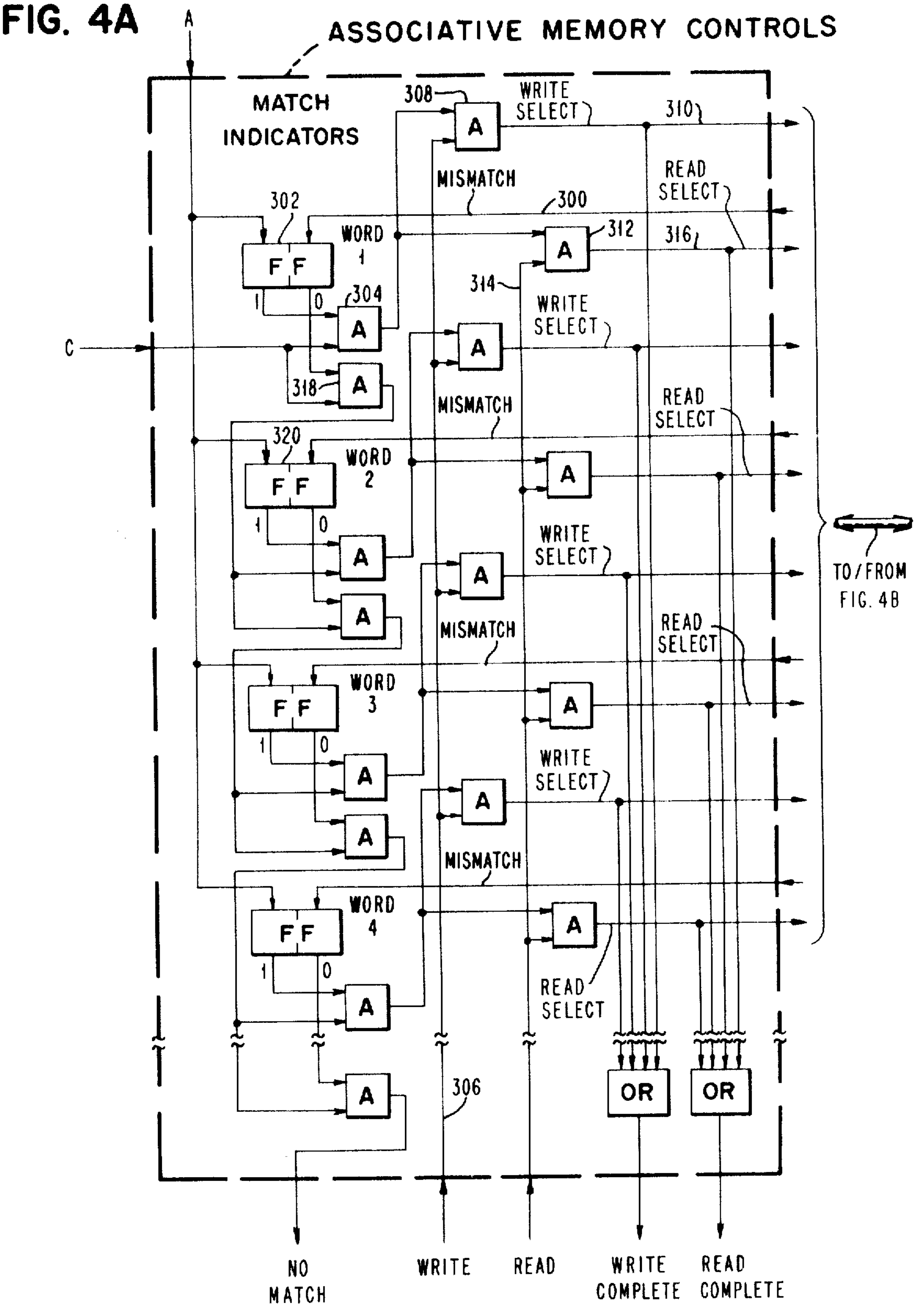
FIG. 4A comprises a logical schematic diagram for typical associative memory controls suitable for use in the present invention.
Figure 4B:
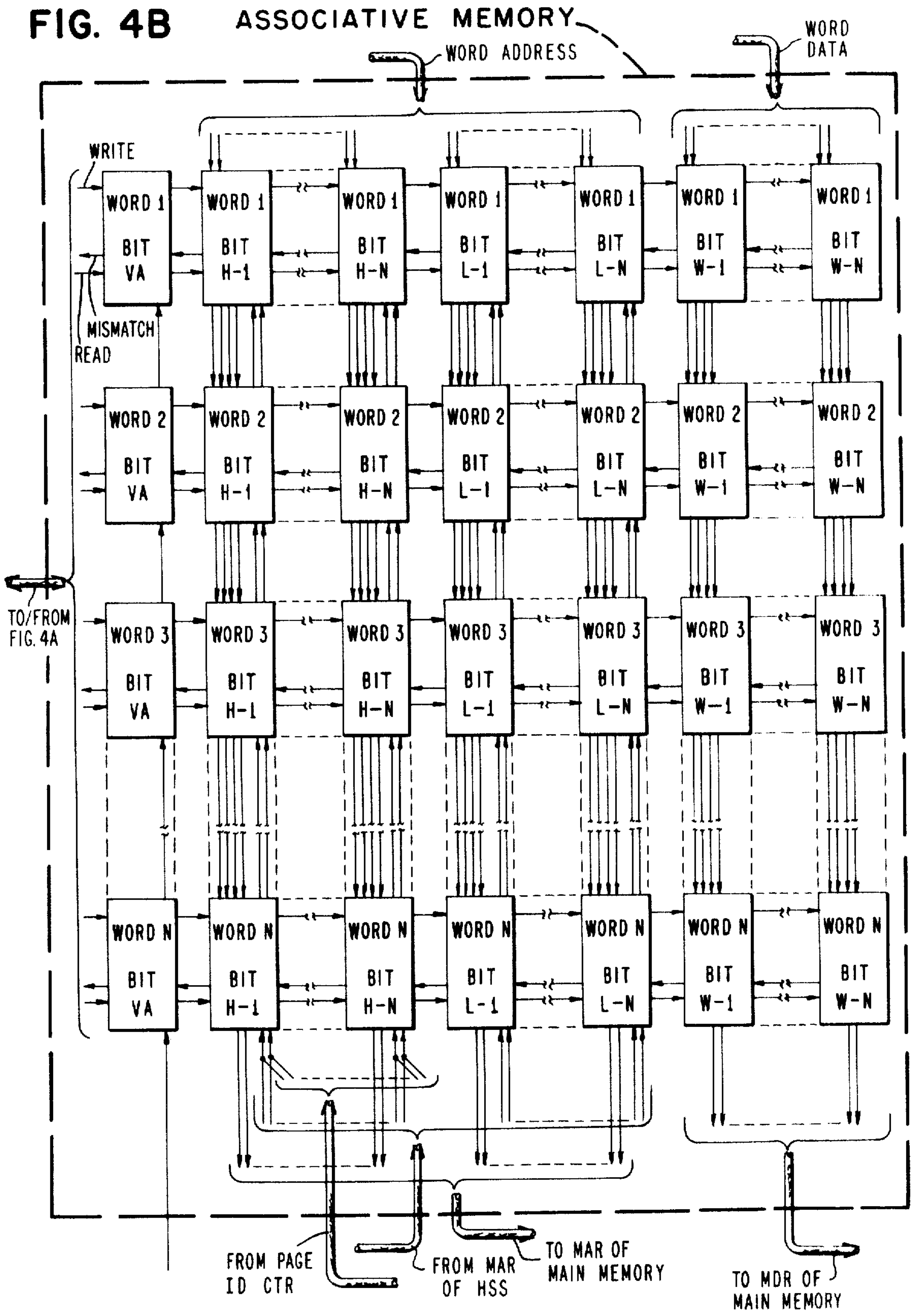
FIG. 4B illustrates the actual storage section of an associative memory operable under the controls shown in FIG. 4A.

Referring first to FIG. 4A, which should be viewed together with FIG 4B, the associative memory controls are shown. The match indicator flip-flops are reset to a 1 by the pulse A and may selectively be set to 0 by one of the "no match" lines from the actual storage element matrix becoming active. The B pulse causes either the vacancy bit or the page identifying address bits of the associative memory to be interrogated as was described previously and, depending upon the particular match criteria selected, it will be assumed that a match was found in the system. Assuming, for example, that the vacancy bit was interrogated and word 01 was found to be vacant, line 300 would not be activated thus leaving flip-flop 302 in its 1 state. As will be apparent, the other match indicators will or will not be reset to a 0 in accordance with the match criteria selected.

Since the match criteria just described was for a vacancy bit, it will be assumed that it is desired to perform a "write" operation in the associative memory. The application of the C pulse to the system will cause AND circuit 304 to be enabled since flip-flop 302 is still set to a 1. Line 306 being now energized enables AND circuit 308 to initiate the write select line 310 which will cause the data stored in the MAR and MDR of the high-speed store to be written into the address and word data fields respectively of the associative memory at the word 01 location. The energization of line 310 will also cause the vacancy bit flip-flop to be set to a 1. If on the other hand, a "read" operation had been indicated, the output of AND circuit 304 would enable one side of the AND circuit 312 the other side of which was enabled by the read line 314. This would bring up the read select line 316 to gate out the contents of word 01 of the associative memory.

It will be noted that if flip-flop 302 had been reset to 0, by energization of its "no match" line 300, pulse C would have propagated down through AND gate 318 to in effect interrogate the setting of flip-flop 320 to see if a match or "no match" condition existed for this word. The C pulse would thus propagate down through all of the other match indicators until either a match were found or a "no match" indication produced. The effect of a "no match" indication has been described previously.

Figure 5:
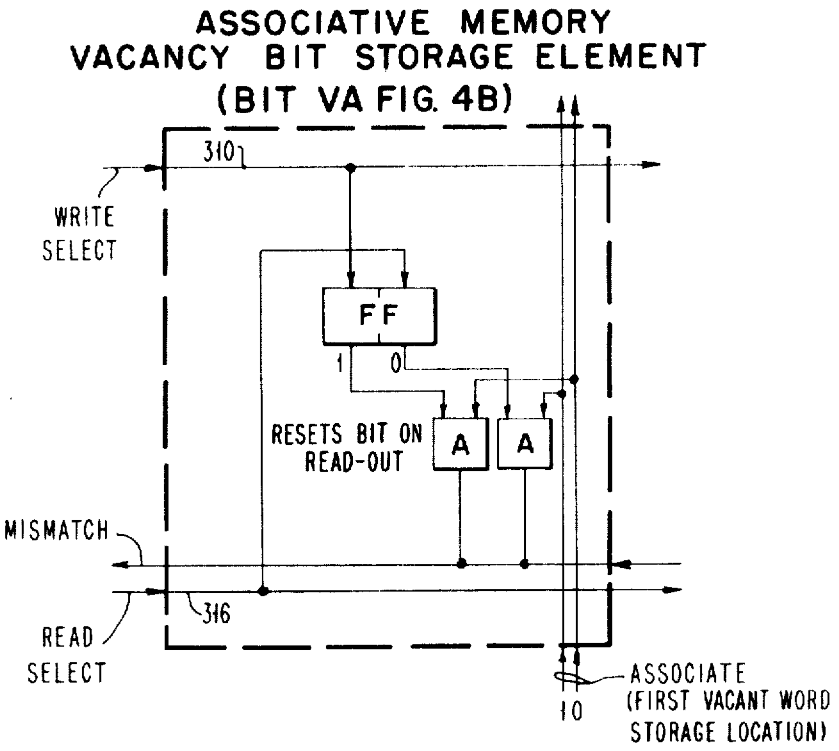
FIG. 5 comprises a logical schematic diagram of a single associative memory vacancy bit storage element (VA) as shown in FIG. 4B.
Figure 6:
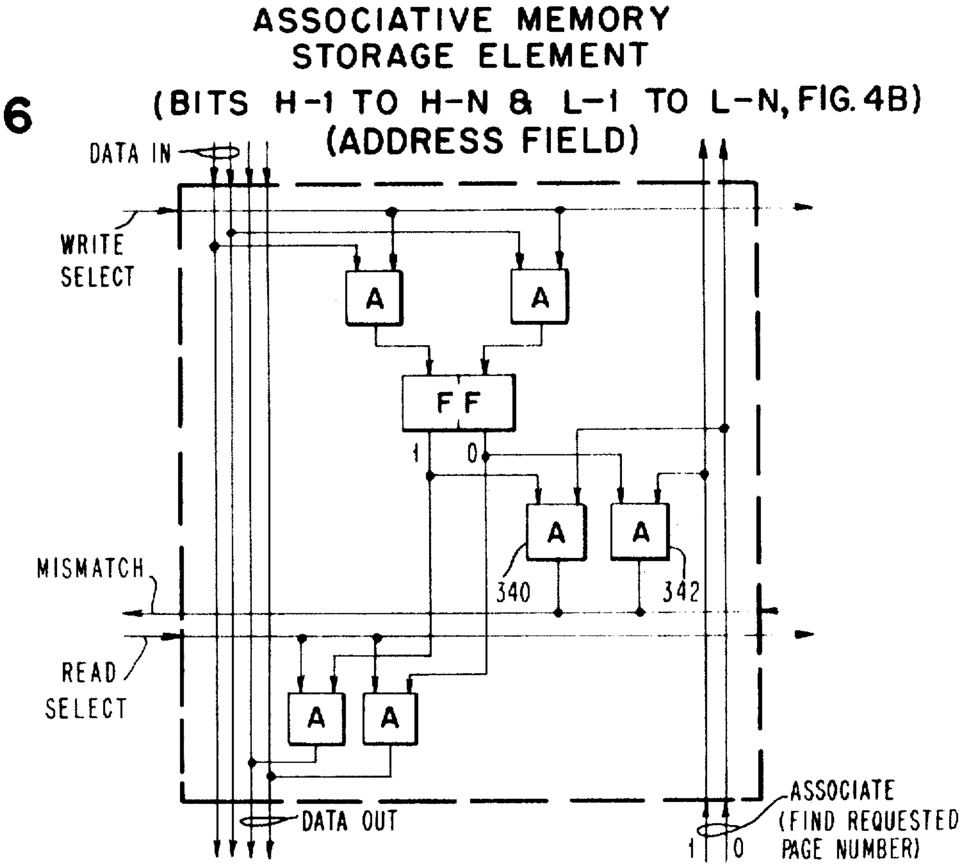
FIG. 6 comprises a logical schematic diagram of an associative memory bit storage element as shown in FIG. 4B.

Referring briefly to FIG. 4B, each of the blocks represents a particular bit storage location in the main memory. The contents of the individual bits is described in FIGS. 5 and 6 wherein FIG. 5 represents a vacancy bit and FIG. 6 represents the actual bit storage elements. The write, no match and read lines corresponding to the lines 310, 300 and 316 for word 01 of FIG. 4A have been similarly labeled on FIG. 4B. The operation of all the other storage elements is of course the same.

Referring now to FIG. 5, there is shown a vacancy bit storage element which is a simplified version of the bit storage element shown in FIG. 6. Only one input bit line is shown since it is only necessary to interrogate for the existence of a 1 setting in the flip-flop which will produce a "no match" indication for the word. It is also never necessary to read out the contents of the vacancy bit, accordingly no read out lines are required. Since the flip-flop is set strictly by the read and write select lines, no data input lines are required.

FIG. 6, as stated, illustrates a bit storage element as would be utilized in bits H–1 to H–N and L–1 to L–N. The flip-flop itself is set by the concurrent application of data on the data in lines and the energization of the write select and is conversely read out by the concurrent application of inputs to the lower pair of AND circuits from the read select line and the output of the flip-flop. The "no match" line will obviously only be activated by 1 or a 0. It is applied to the associate lines and the "no match" is detected by one of the AND circuits 340 or 342. As will be noted, the lines entering and leaving the storage element indicated in FIG. 6 are the same as those shown on FIG. 4B. That is, each block has four vertical read/write lines, two vertical associate lines, a single horizontal "no match" line and a pair of horizontal read/write lines. It should be noted in passing that the outputs of all of the "no match" AND gates 340 and 342 are in effect dot ORed to the "no match" line. Thus, in any bit position on any word does not correspond to the argument applied to that bit for each word, a "no match" signal will be applied to the line, and as will be apparent, any "no match" on any given word line will be effective to reset the match indicators back to a 0.

The above description of the specific details of the associative memory completes the description of the present disclosed embodiment.

It will be readily apparent to those skilled in the art that many changes in form and detail could readily be made in the disclosed embodiment without departing from the true spirit and scope of the present invention.

A number of alternative design possibilities have been enumerated previously. In addition, such features as providing additional controls to lock out a particular store through operation for a particular word could be provided where, for example, a given storage location is being continually updated by some sort of loop or iterative operation wherein the word would be altered each time the system passes through the loop. A control bit, for example, could be utilized to lock out the store through from the associative memory until a reset pulse is obtained from the system indicating that the loop operation had been terminated.

Additionally, such features as providing for a direct store through could be set up where a memory cycle in the main store is currently available and instead of storing the word concurrently in the associative memory, this operation could be eliminated. However, it is believed that the controls for this alternative form of operation would be rather extensive.

It should finally be clearly understood that the terms high and low speed when referring respectively to the high-speed store and the main memory or backup store are merely relative designations and are not intended to be in any way limiting on the scope of the invention as set forth in the claims. However, it is anticipated that there would be a significant difference in the speed of the two memories for the present invention to have any significant utility.

While the invention has been particularly shown and described with reference to a preferred embodiment thereof, it will be understood by those skilled in the art that the foregoing and other changes in form and details may be made therein without departing from the spirit and scope of the invention.

We claim:

1. In a computing system including a first memory and a second memory wherein data is organized in both said memories in first data segments and wherein each first data segment is composed of a number of smaller second data segments, means for transferring said first data segments from said first memory to said second memory whenever the system request such a transfer, and means for accessing said second data segments from said second memory for use in said computing system, the improvement which comprises:

- means for rewriting second segments of data in said second memory which are altered by the system;
- means for indicating when a second segment of data stored in said second memory has been altered; and
- means for writing said altered second segments of data in said first memory on a low priority basis when time is available in said first memory.

2. A computing system as set forth in claim 1 including control means operative to store said altered second segments of data in said first memory at a time noncoincident with the storage of said altered second segments of data in said second memory.

3. A computing system as set forth in claim 2 wherein said indicating means comprises an associative memory and said system includes means for storing a second data segment in both said second memory and said associating memory when such a segment is returned to the memories from the computer wherein any such segment is assumed to be altered.

4. A hierarchical memory system for use with an electronic computer system, said memory system including a large low speed memory and a small high-speed memory data being organized in both said memories into a plurality of first data segments wherein each said first segment is composed of a plurality of individually addressable second data segments;

means for transferring complete first segments of data from the low speed memory into the high-speed memory whenever the system requests such a transfer;

means for transferring second data segments from said high-speed memory into the computing system whenever the system requests such a transfer, means for rewriting into the high-speed memory any second data segment altered by the computer;

means for indicating that certain second data segments have been altered; and means for rewriting in the low-speed memory altered second data segments in said high-speed memory.

5. A memory system as set forth in claim 4 wherein said means for rewriting in said low speed memory all altered second data segments included in a particular first data segment operates on a high priority basis when the system requests replacement of said first data segment in said high-speed store.

6. A memory system as set forth in claim 4 wherein said indicating means includes an associative memory and means for concurrently storing all altered second data segments in said high-speed memory and in said associative memory and wherein said rewriting means for storing all altered second data segments in said low speed memory transfers second data segments from said associative memory to said low speed memory.

7. A memory system as set forth in claim 6 including means for storing in said associative memory, together with said altered second data segments, the address at which said altered second data segment is to be stored in said low speed memory; and means for identifying the first data segment to which an altered second data segment belongs based upon said data address.

8. A memory system as set forth in claim 7 including means to prevent the computer system from writing an altered data segment in said high-speed memory when no space is available for concurrently writing said altered second data segment in said associative memory.

9. A memory system as set forth in claim 8 including means for replacing a first altered second data segment stored in the associative memory with a further alteration of said segment if the first altered segment has not yet been rewritten in the low speed memory.

10. A memory system as set forth in claim 8 including means for determining that a first data segment requested by the system is not present in the high-speed memory, means for determining if space is available in said high-speed memory, means for transferring a first data segment from said low speed memory to said high-speed memory, and means operable upon determination that no empty space is available in said high-speed memory for indicating which first data segment already therein is to be overwritten by said requested new first data segment.

11. A memory system as set forth in claim 10 including means operable upon the indication of which first data segment is to be replaced in said high-speed memory to immediately cause said rewriting means to rewrite all altered second data segments included in said first data segment into said low speed memory on a high priority basis and means for preventing the transfer of the new first data segment into said high-speed memory until said last named rewriting operation is complete.

12. A memory system as set forth in claim 11 including control means associated with said associative memory for distributing the rewriting of altered second data segments from said associative memory into said low speed store in accordance with the respective first data segments in which said altered second data segments are included said distribution being based on the addresses of said first data segments in said low speed store.

13. A hierarchical memory system for use with an electronic computer system, said memory system including a large low-speed memory and a small high-speed memory, data being organized in both said memories into a plurality of first data segment wherein each said first segment is composed of a plurality of individually addressable second data segments, said small high-speed memory having storage space therein capable of storing a plurality of first data segments;

means for transferring complete first data segments from the low speed memory into the high-speed memory whenever the system requests such a transfer;

means for transferring second data segments from said high-speed memory into the computer system whenever the system requests such a transfer;

associative memory means;

means for indicating that a second data segment has been altered by the computer system;

means for concurrently writing into the high-speed memory and said associative memory any second data segment altered by the computer system;

the storage of a second data segment in said associative memory providing an indication that such second data segments have been altered;

means for storing together with an altered second data segment in said associative memory the address at which said altered second data segment is to be stored in said low speed memory;

means for rewriting altered second data segments stored in said associative memory in said low speed memory in a predetermined sequence; and control means for effecting the memory storage sequences in the following order of priority:

1. rewriting in said low-speed memory any altered second data segments currently in said associative memory which form a part of a first data segment which is to be replaced in the high-speed memory,
2. concurrently writing altered second data segments received from the computer in both said high-speed and said associative memories as long as space is available in said associative memory, and
3. rewriting in said low speed memory on a time available basis altered second data segments currently stored in said associative memory wherein the first data segments containing the altered second data segments are served on a cyclical basis unless a replacement indication is detected.

14. A memory system as set forth in claim 13 including means operable before writing a second data segment from the computer stem into the associative memory for examining the low-speed memory address of said second data segment to determine if a second data segment having the same address is currently stored in a nonvacant position of said associative memory; and means responsive to a positive determination by said examining means for replacing the second data segment currently stored in the associative memory with the new second data segment from said computing system.

15. A memory system as set forth in claim 14 including means for determining whether there are any available storage locations in said associative memory, means operable upon a determination that no available location currently exists in said associative memory to prevent the reading in of a new altered second data segment into either the high-speed or the associative memory until a storage space becomes available in said associative memory.